United States Patent [19]

Parra

[11] Patent Number: 4,562,745

[45] Date of Patent: Jan. 7, 1986

[54] FLOWMETER

[75] Inventor: Jaime A. D. Parra, Winchester, England

[73] Assignee: Sarasota Automation Limited, Winchester, England

[21] Appl. No.: 560,596

[22] Filed: Dec. 12, 1983

[30] Foreign Application Priority Data

Dec. 17, 1982 [GB] United Kingdom ............... 8235943

[51] Int. Cl.⁴ ............................................. G01F 1/32
[52] U.S. Cl. ................................................ 73/861.22
[58] Field of Search ........... 73/861.22, 861.23, 861.24, 73/118.2

[56] References Cited

U.S. PATENT DOCUMENTS 3,116,639  1/1964  Bird ................................. 73/861.24

Primary Examiner—Charles A. Ruehl
Attorney, Agent, or Firm—Paul L. Sjoquist

[57] ABSTRACT

A flowmeter for insertion in a fluid conduit, the flowmeter comprising a tubular member for the passage therethrough of a fluid which flows through said conduit and whose flow rate is to be measured; a bluff body which is mounted in the tubular member so as to produce in said fluid oscillations whose frequency varies with said flow rate; sensor means responsive to said fluid oscillations for indicating said flow rate; and vortex reducing means for reducing the separation of vortices from the tubular external surface of the tubular member.

8 Claims, 12 Drawing Figures

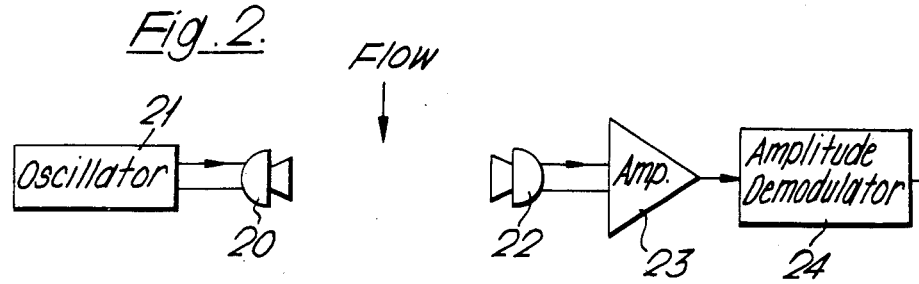
Fig. 2.
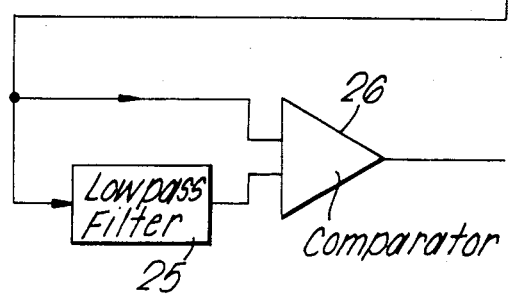
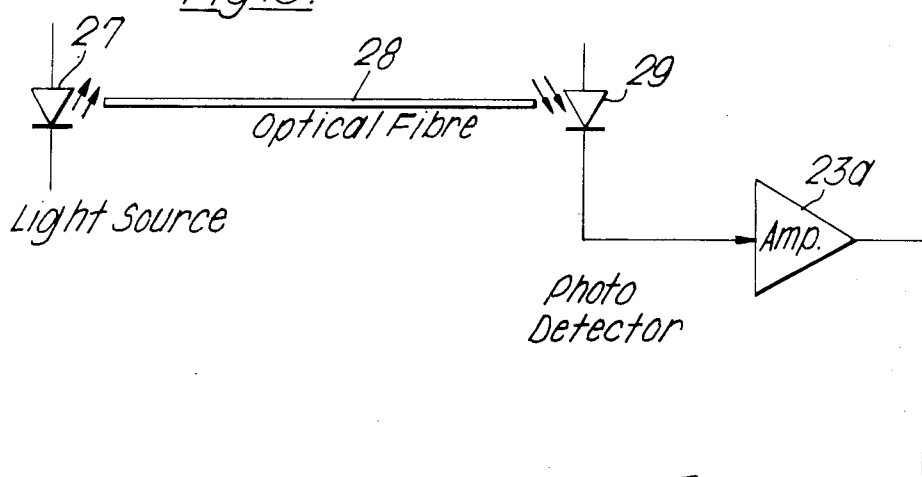
Fig. 3.
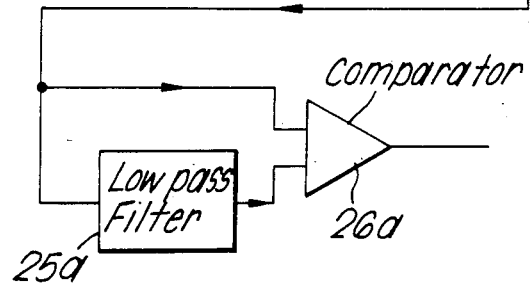

FLOWMETER

BACKGROUND OF THE INVENTION

This invention concerns a flowmeter.

A vortex shedding insertion flowmeter is known, e.g. from U.S. Pat. No. 3,587,312, which is arranged for insertion in a fluid conduit and which comprises a tubular member for the passage therethrough of a fluid which flows through said conduit and whose flow rate is to be measured. A bluff body is mounted in the tubular member so as to effect vortex shedding whereby to produce in said fluid oscillations whose frequency varies with said flow rate, there being sensor means responsive to said fluid oscillations for indicating said flow rate.

In known vortex shedding insertion flow meters, however, the pulse/velocity characteristic, i.e. the relationship of the number of pulses per unit time, as sensed by said sensor means, to the velocity of the fluid, is not linear at low flow. We have now found that this phenomenon arises from the fact that vortices are shed both from the bluff body and from the tubular external surface of the tubular member, and that the latter vortices interfere with those from the bluff body itself, so as to affect adversely the flow reading produced by the said sensor means.

BRIEF DESCRIPTION OF THE INVENTION

According, therefore, to the present invention there is provided a flowmeter for insertion in a fluid conduit, the flowmeter comprising a tubular member for the passage therethrough of a fluid which flows through said conduit and whose flow rate is to be measured; a bluff body which is mounted in the tubular member so as to produce in said fluid oscillations whose frequency varies with said flow rate; and sensor means responsive to or affected by said fluid oscillations for indicating said flow rate and/or for effecting a control in dependence thereon, characterized in that there are vortex reducing or reattaching means for preventing or reducing the separation of vortices from the tubular external surface of the tubular member and/or for effecting reattachment of said vortices to the said tubular external surface or to means connected thereto.

The vortex reducing or reattaching means preferably comprises fins which are secured to the downstream side of the tubular member and extend substantially parallel to the fluid flow in which the said fluid oscillations have been generated by the bluff body, the fins being spaced apart for the passage of the fluid therebetween and having a length such that vortices which have been shed from the said tubular external surface may be reattached to said fins.

Thus each said fin desirably has a thickness which does not exceed D/10, where D is the external diameter of the tubular member. Preferably, the thickness of each fin is substantially D/30.

The length of each fin in the direction of fluid flow is moreover preferably in the range 2/3D to 1.5D.

Each fin is preferably constituted by a flat plate.

Instead of providing the said fins, or in addition to providing the latter, the said vortex reducing or reattaching means may comprise an airfoil shaped tubular external surface of the tubular member. Moreover, instead of providing the said fins, or in addition to providing the latter, the said vortex reducing or reattaching means may comprise one or more bleed slots in said tubular member.

The tubular member may be provided with an axially extending support for mounting the tubular member normal to the fluid flow through the conduit, the tubular member having upstream and downstream apertures therein to permit the fluid to flow through the tubular member in a direction normal to the axis of the latter.

The sensor means may comprise means for transmitting ultrasonic signals to the fluid flow in which the said fluid oscillations have been generated by the bluff body, and means for receiving and analyzing the ultrasonic signals which have passed through said fluid.

Alternatively, the sensor means may comprise fibre optic means past which flows the fluid in which the said fluid oscillations have been generated by the bluff body.

A further possibility is that the sensor means comprises a differential pressure member one side of which is subject to the dynamic pressure of the fluid in which the said fluid oscillations have been generated by the bluff body and the opposite side of which is subjected to the static pressure in said fluid.

BRIEF DESCRIPTION OF THE DRAWINGS

The invention is illustrated merely by way of example, in the accompanying drawings, in which:

FIG. 2 is a block diagram of a first embodiment of sensor means which may form part of the flowmeter of FIG. 1, FIG. 3 is a block diagram of a second embodiment of sensor means which may form part of the flowmeter of FIG. 1.

DESCRIPTION OF THE PREFERRED EMBODIMENTS

Figure 1:
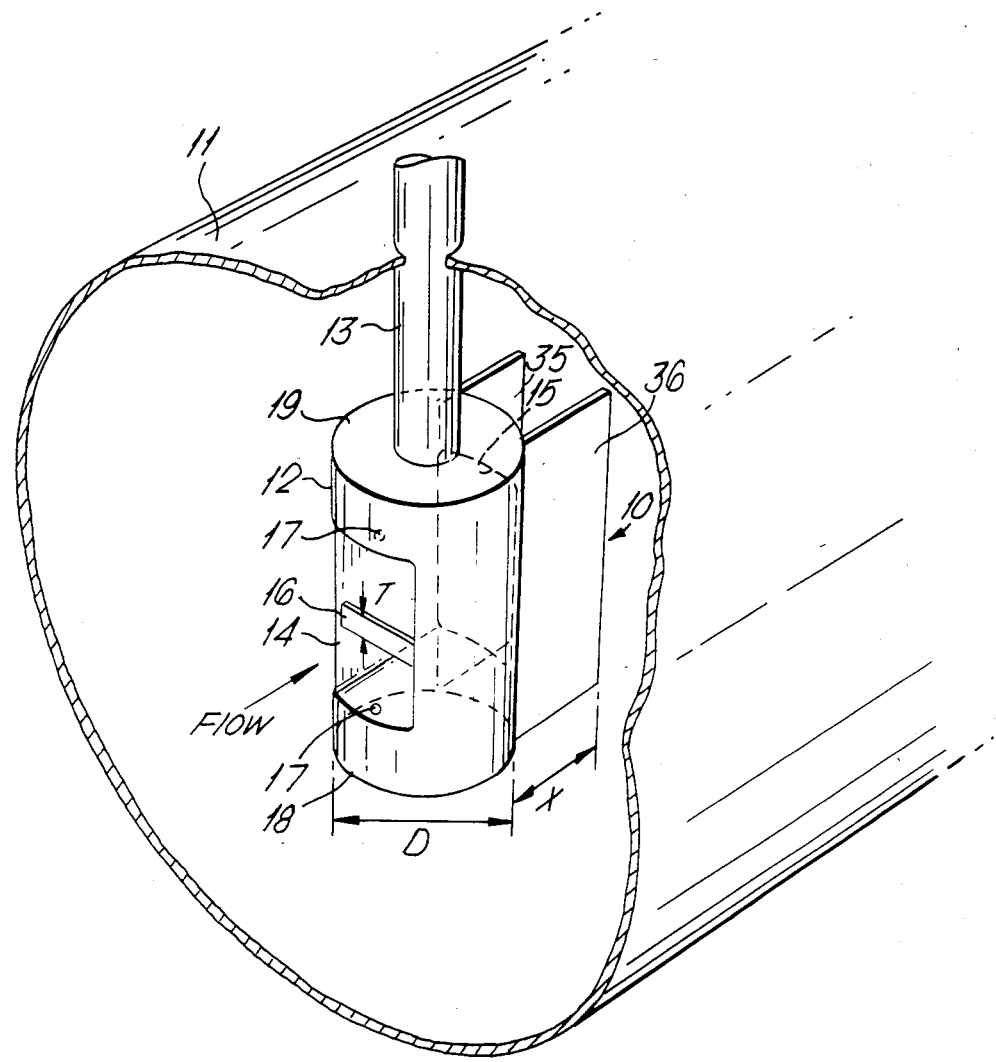
FIG. 1 is a perspective view of a flowmeter according to the present invention mounted in a fluid conduit.

In FIG. 1 there is shown a flowmeter 10 which is shown as inserted in a conduit 11 through which may flow a fluid whose flow rate is to be measured. The flowmeter 10 comprises a tubular member 12 having an axially extending support 13 by means of which the flowmeter 10 is mounted within the conduit 11 so as to be disposed normal to the fluid flow through the conduit 11. The tubular member 12 has upstream and downstream apertures 14, 15 therein to permit the fluid which is passing through the conduit 11 to flow through the interior of the tubular member 12 in a direction normal to the axis of the latter.

Mounted in the tubular member 12, adjacent to its upstream side, is a bluff body 16 from which vortices are shed and which therefore produces, in the fluid flowing through the aperture 14, oscillations whose frequency varies with the flow rate of the fluid which has passed the bluff body 16 and therefore with the flow rate of the fluid passing through the conduit 11. The bluff body 16 may have a thickness of substantially D/7, where D is the external diameter of the tubular member 12. The oscillations which are thus produced by the bluff body 16 can be detected by sensor means 17 so as to indicate the said flow rate. One way in which this may be done is illustrated in FIG. 2 where the fluid which has passed through the flowmeter 10 and which thus contains a vortex train flows past a transmitting terminal 20 of an ultrasonic oscillator 21, e.g. of approximately 25 kHz. The vortex train which passes the transmitting terminal 20 effects amplitude modulation of the ultrasonic signals from the oscillator 21, and these amplitude modulated ultrasonic signals are received by a terminal 22 and amplified by an amplifier 23, e.g. a 25 kHz amplifier. The amplified signals then pass to an amplitude demodulator 24. The latter is connected both directly and through a low pass filter 25 to a comparator 26 whose pulse output is an indication of the pulse or vortex frequency and thus of the flow rate through the conduit 11.

Alternatively, as shown in FIG. 3, the fluid containing the vortex train may be directed over an optical fibre 28 which is connected between a light source 27 and a photo-detector 29 so that the vortex train effects amplitude modulation of the light signal from the light source 27. The light transmitted by the optical fibre 28 is analyzed by a circuit similar to that shown in FIG. 2. Thus the photo-detector 29 feeds an amplifier 23a which feeds a comparator 26a both directly and through a low pass filter 25a. The pulse output from the comparator 26a is an indication of the pulse or vortex frequency and thus of the flow rate through the conduit 11.

A further possibility (not shown) is to provide a differential pressure member one side of which is subjected to the dynamic pressure of the fluid in which the vortex train has been generated by the bluff body 16 and the opposite side of which is subject to the static pressure in said fluid, signals from the differential pressure member being passed to a circuit such as that shown in FIG. 2.

Figure 4:
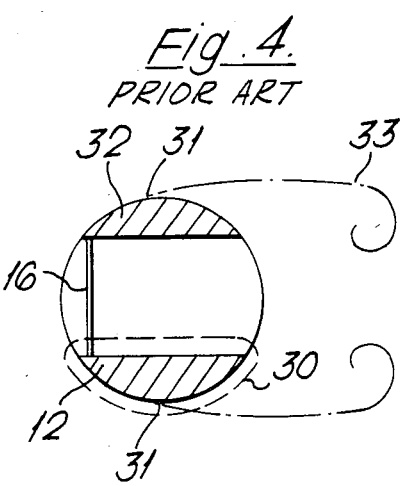
FIG. 4 is a sectional view of a prior art flowmeter to illustrate the vortices produced thereby.

As so far described, and as shown in the sectional view of FIG. 4, not merely will the bluff body 16 produce a vortex generated circulation indicated at 30, but also the tubular member 12 itself will generate vortices due to the flow separation which occurs at points 31 on the tubular external surface 32 of the tubular member 12. This will give rise to the vortex train illustrated at 33. The vortex train 33 will become mingled with the vortex train 30 and this will produce inaccurate readings, especially at low flows.

Figure 5:
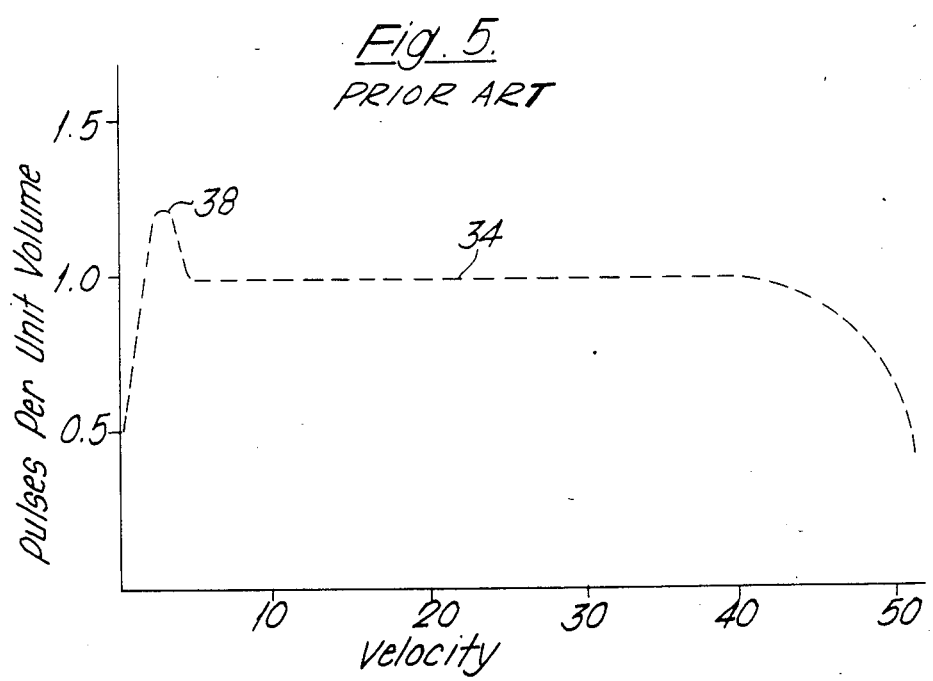
FIG. 5 is a graph showing the pulse/velocity characteristic of the prior art flowmeter.

Thus in FIG. 5 there is shown the characteristic of a known flowmeter as illustrated in FIG. 4, the abscissa of the graph of FIG. 5 representing the velocity, e.g. in meters per second, of the fluid flowing through the conduit 11, and the ordinate of the graph representing the pulses per unit volume (e.g. pulses per cubic metre) which are produced in the sensor means 17. As will be seen from FIG. 5, in the prior art flowmeter the initial part 38 of the characteristic is not linear and in fact has a "hump", while the linear portion 34 of the characteristic extends over a range such that the ratio of the maximum to the minimum reading which is possible in the prior art flowmeter is approximately 15:1.

In order to prevent such interference between the vortex train 33 and the vortex train 30, the flowmeter 12 is provided with two flat plate fins 35, 36 which are secured to the downstream side of the tubular member 12 and which extend substantially parallel to the fluid flow in which the fluid oscillations of the vortex train have been generated by the bluff body 16. The fins 35, 36 are spaced apart for the passage of this fluid therebetween and have a length such that the vortices which have been shed from the points 31 on the tubular external surface 32 of the tubular member 12 become reattached to the fins 35, 36 so as to prevent interference between the vortices 33, 30. Thus the passage between the fins 35, 36 provides a longer channel for the vortex stream from the bluff body 16 to establish itself.

Each fin has a thickness which does not exceed D/10, the thickness preferably being substantially D/30. Thus D may have the value 30 mm and the thickness of the fins may be 1 mm to 3 mm. Moreover, the length X of each fin 35, 36 in the direction of fluid flow may be between 2/3D to 1.5D and is preferably substantially equal to D.

Figure 6:
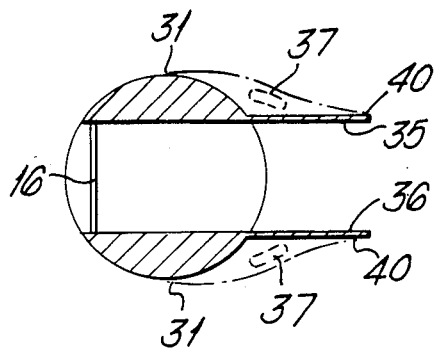
FIG. 6 is a diagrammatic sectional view of the flowmeter of FIG. 1 to illustrate the nature of the flow therethrough.

The effect of the provision of the fins 35, 36 is illustrated in FIG. 6 where it can be seen that the vortices which are shed from the points 31 become reattached to the downstream ends of the fins 35, 36 there being vortex circulations 37 externally of the fins 35, 36. At the points 40 at which reattachment occurs, only small vortices will be generated if the velocity of the fluid between the fins 35, 36 is not identical to that outside the latter.

Vortices will also be produced by the opposite axial ends 18, 19 of the tubular body 12 but unlike the vortices 33, which may feed back through the flowmeter so as to have the effect of either increasing or reducing the effective velocity through the meter, the vortices from the opposite axial ends 18, 19 of the tubular member 12 do not appear to have any substantial effect upon the reading produced by the meter.

Figure 7:
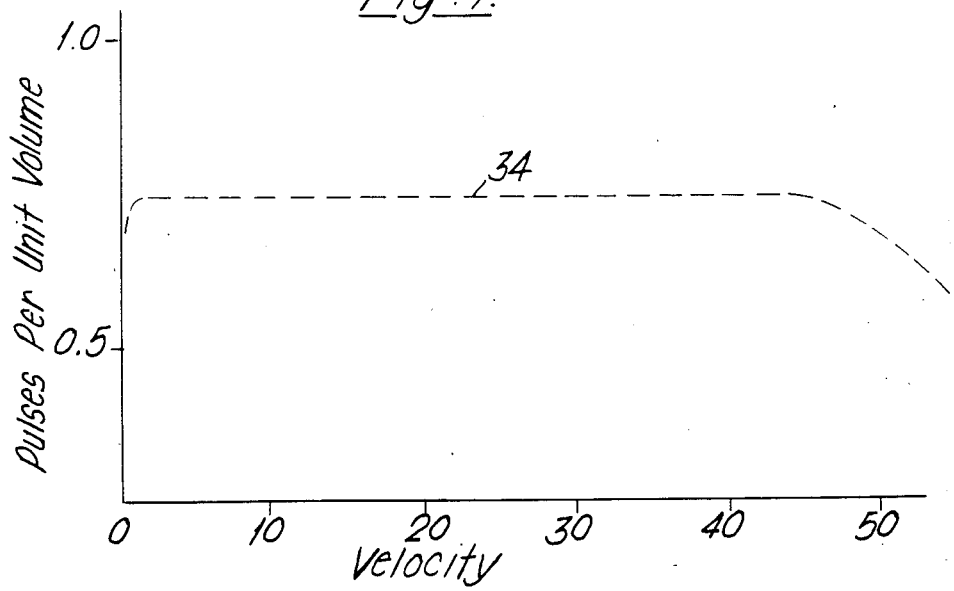
FIG. 7 is a graph showing the pulse/velocity characteristic of a flowmeter as shown in FIGS. 1 and 6, and FIGS. 8(a)–(e) illustrate various alternative constructions of a flowmeter according to the present invention.

The result of providing the fins 35, 36 as shown in FIGS. 1 and 6 is illustrated by the characteristic of FIG. 7.

As will be seen, in the characteristic of FIG. 7 the initial non-linear portion 38 of the characteristic almost disappears while the length of the linear portion 34 of the characteristic is increased so that the ratio of the maximum reading of the meter to its minimum reading is increased to at least 90:1.

In addition to providing the fins 35, 36, or in substitution therefor, the tubular member 12 may be appropriately shaped in such a way as to prevent or reduce the separation of the vortices from the tubular external surface 32 of the tubular member 12.

Figure 8A:
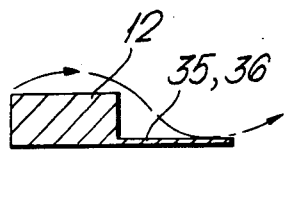

Thus FIG. 8(a) illustrates the case where the vortices which have been shed by the tubular external surface of the tubular member 12 becomes reattached only by reason of the provision of the fins 35, 36. On the other hand, FIG. 8(b) illustrates the case in which the vortices shed from the tubular external surface 32 are reattached to this tubular external surface and again to the fins 35, 36 at their downstream end.

Figure 8C:
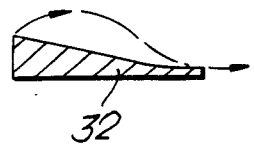
Figure 8B:
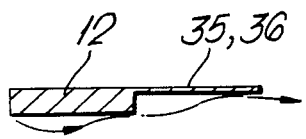

FIGS. 8(a) and 8(b) represent the kind of flow patterns which can occur at different flow rates or with different aspect ratios of the walls of the body. At low flows or with a long thin wall, the flow pattern may be as shown in FIG. 8(b). At higher flows, or with short thick walls, the pattern may be as shown in FIG. 8(a). Thus in FIG. 8(b), in contrast to to FIG. 8(a), the flow reattaches to the wall before separating again at the rear edge of the wall.

In the construction of FIG. 8(c), however, the vortices which have been shed from the tubular external surface 32 become reattached to the downstream end of this surface.

Figure 8D:
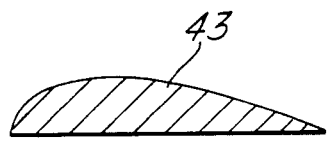
Figure 8E:
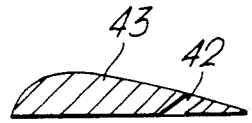

In FIGS. 8(d) and 8(e), the tubular external surface of the tubular member is of airfoil section 43 and accordingly the vortices which would otherwise be shed from the tubular external surface are not generated. Moreover, in the construction of FIG. 8(e), the airfoil section 43 is also provided with one or more bleed slots 42 so as to ensure laminar flow over the air foil section 43, whereby to prevent vortex shedding.

I claim:

1. A flowmeter for insertion in a fluid conduit, the flowmeter comprising a tubular member for the passage therethrough of a fluid which flows through said conduit and whose flow rate is to be measured, the tubular member being affixed in said conduit along an axis which is normal to the direction of fluid flow through said conduit; means defining upstream and downstream apertures in the side walls of said tubular member, the tubular external surface of the tubular member generating vortices in said fluid; a bluff body which is mounted in the tubular member between said apertures so as to produce, in said fluid, oscillations whose frequency varies with said flow rate; sensor means responsive to said fluid oscillations for indicating said flow rate; and fins which are secured to the downstream side of the tubular member on either side of the downstream aperture so that they extend substantially parallel to the fluid flow in which the said fluid oscillations have been generated by the bluff body, the fins being spaced apart for the passage of the fluid therebetween and having a length such that the vortices which have been shed from the said tubular external surface may become reattached to said fins.

2. A flowmeter as claimed in claim 1 in which each said fin has a thickness which does not exceed D/10, where D is the external diameter of the tubular member.

3. A flowmeter as claimed in claim 2 in which the thickness of each fin is substantially D/30.

4. A flowmeter as claimed in claim 1 in which the length of each fin in the direction of fluid flow is in the range 2/3D to 1.5D, where D is the external diameter of the tubular member.

5. A flowmeter as claimed in claim 1 in which each fin is constituted by a flat plate.

6. A flowmeter for insertion in a fluid conduit, the flowmeter comprising a tubular member for the passage therethrough of a fluid which flows through said conduit and whose flow rate is to be measured; a bluff body which is mounted in the tubular member so as to produce, in said fluid, oscillations whose frequency varies with said flow rate; sensor means responsive to said fluid oscillations for indicating said flow rate; vortex reducing means for reducing the separation of vortices from the tubular external surface of the tubular member and an axially extending support for mounting the tubular member normal to the fluid flow through the conduit, the tubular member having upstream and downstream apertures therein to permit the fluid to flow through the tubular member in a direction normal to the axis of the latter.

7. A flowmeter as claimed in claim 6 in which the sensor means comprises means for transmitting ultrasonic signals to the fluid flow in which the said fluid oscillations have been generated by the bluff body, and means for receiving and analyzing the ultrasonic signals which have passed through said fluid.

8. A flowmeter as claimed in claim 6 in which the sensor means comprises fibre optic means past which flows the fluid in which the said fluid oscillations have been generated by the bluff body.

* * * * *